(12) United States Patent
Sha et al.

(10) Patent No.: US 8,363,729 B1
(45) Date of Patent: Jan. 29, 2013

(54) VISUAL DATA COMPRESSION ALGORITHM WITH PARALLEL PROCESSING CAPABILITY

(75) Inventors: Li Sha, San Jose, CA (US); Haohong Wang, San Jose, CA (US); Leung Chung Lai, Union City, CA (US); Tzun Wei Lee, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 537 days.

(21) Appl. No.: 12/612,836

(22) Filed: Nov. 5, 2009

Related U.S. Application Data

(60) Provisional application No. 61/112,031, filed on Nov. 6, 2008, provisional application No. 61/112,027, filed on Nov. 6, 2008.

(51) Int. Cl.
*H04N 7/26* (2006.01)

(52) U.S. Cl. ............... 375/240.23; 375/240.24

(58) Field of Classification Search .......... 375/240.23, 375/240.24
See application file for complete search history.

(56) References Cited

U.S. PATENT DOCUMENTS 5,148,272 A * 9/1992 Acampora et al. ......... 375/240.1

* cited by examiner

*Primary Examiner* — Sath V Perungavoor
*Assistant Examiner* — Jeffery Williams

(57) ABSTRACT

Methods and systems for using a video data compression algorithm with parallel processing capability are provided. AC and DC coefficients associated with blocks of the video data, along with quantization errors, may be encoded using a variable length code. The quantization errors may be encoded using a scheme that assigns priorities to the quantization errors based on the position of their associated AC and/or DC coefficients in a block of the video data. The quantization errors may be appended to a bitstream in an order based on these priorities that enables parallel coding of the quantization errors and AC and DC coefficients in each block of video data. Data packing schemes may also be applied to the coded data to maximize the use of bandwidth resources in encoding and/or decoding.

14 Claims, 11 Drawing Sheets

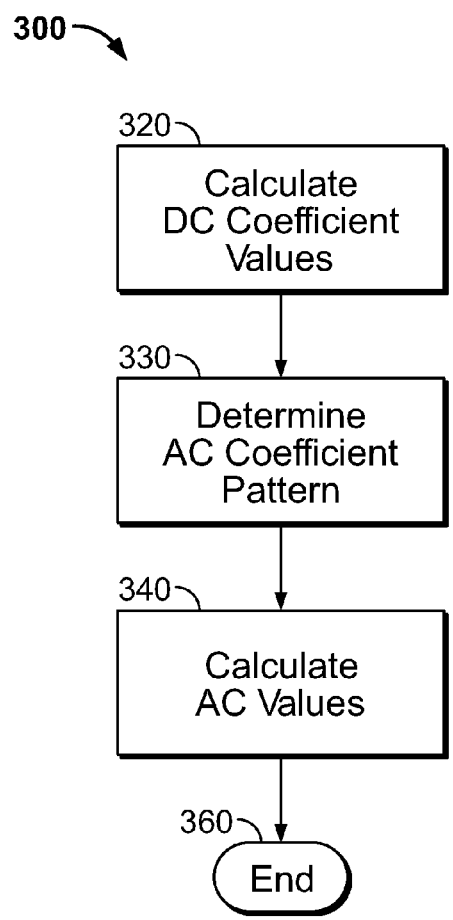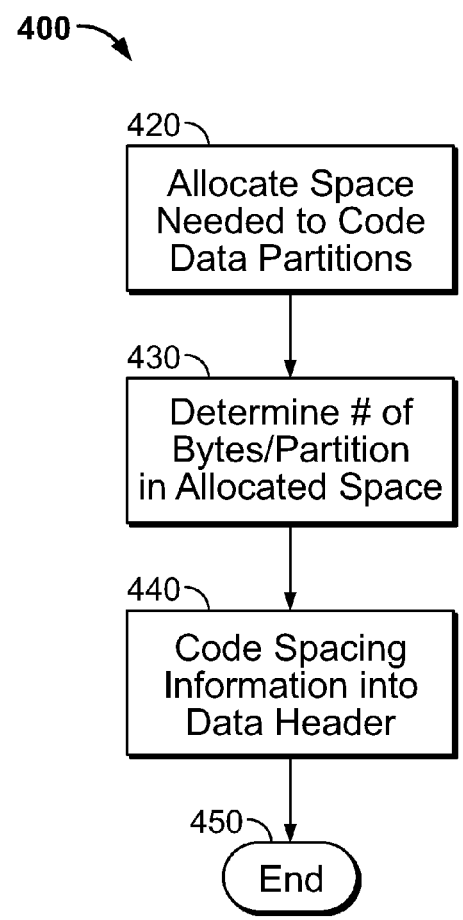
FIG. 3
FIG. 4

VISUAL DATA COMPRESSION ALGORITHM WITH PARALLEL PROCESSING CAPABILITY

This claims the benefit of U.S. Provisional Application Nos. 61/112,027 and 61/112,031, each filed on Nov. 6, 2008, which are hereby incorporated by reference herein in their entirety.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted as prior art against the present disclosure.

Video data compression may require a tradeoff between memory bandwidth and the cost of hardware (e.g., double data rate synchronous dynamic random access memory, or DDR SDRAM) required to decompress the video in a reasonable time. As consumers demand higher quality video, required memory bandwidth may increase into the range of gigabytes per second. This may result in the need for more expensive memory chips in video data compression systems, and result in a higher system cost.

SUMMARY

Methods and systems for using a video data compression algorithm with parallel processing capability are provided in accordance with various embodiments of the present invention. This compression algorithm may maximize the use of bandwidth resources in a video compression system.

The compression algorithm may encode input video data into compressed video data in the form of a bitstream. The bitstream may be stored in allocated space in a memory, i.e., a buffer. In some embodiments, the buffer may be implemented in hardware, such as DDR SDRAM. In other embodiments, the buffer may be implemented in software, such as a virtual buffer instantiated by an operating system. To prepare input data for encoding into a bitstream, the data may be converted to a different color space, transformed, reordered, and/or quantized. In some embodiments, the transform produces a set of AC coefficients and DC coefficients associated with a block of the input data. A block of input data is associated with a block of pixels in the video data itself. Quantization of the AC coefficients and DC coefficients may produce a set of quantization errors associated with respective AC coefficients and DC coefficients. The AC coefficients, DC coefficients, and quantization errors may be coded using any suitable variable length code. In some embodiments, the bitstream may be partitioned according to an amount of space required to store the coded AC coefficients, DC coefficients, and quantization errors in the bitstream, as well as the size of blocks of compressed data. In some embodiments, spacing information related to these partitions may be stored in headers in the bitstream.

In some embodiments, the quantization errors may be encoded into the bitstream according to priorities. These priorities may be based on a layered coding scheme that takes into account the original position of the AC and/or DC coefficients associated with the quantization errors in the blocks of video data. In some embodiments, the order in which the quantization errors are appended into the bitstream may be based on the priorities assigned to the coded quantization errors.

In some embodiments, the quantization errors may be appended into partitions in the bitstream according to a data packing scheme. In some embodiments, the coded AC coefficients, DC coefficients, and quantization errors associated with a particular block of video data may be encoded into a partition in the bitstream associated with that particular block of video data until a partition boundary (e.g., a decodable point in the bitstream) is reached. The coded data associated with the particular block of video data that is not able to be written in an associated partition may be stored in a queue. Other partitions in the bitstream may then be searched for unused space, and the coded data may be pulled off the queue and appended into the unused space. Once all or nearly all of the video data has been encoded, the encoding process is terminated, and the compressed data is output.

The coded data may be decoded according to a parallel decoding scheme. In some embodiments, the quantization error and the AC and DC coefficients within the same partition of the bitstream may be decoded in parallel. This parallel decoding may be enabled by the organization of the coded data—for example, the quantization errors may be coded in the least significant bits of each partition, while the coded AC and DC coefficients may be coded in the most significant bits of each partition. In embodiments where a data packing scheme has been used to encode the data into the bitstream, the decoded data may be reordered and/or redistributed such that the coded data associated with a particular partition is aligned in the decoded data. The decoded data may be dequantized, reordered, and/or run through an inverse transform. The decoded data may then be converted back to its original color space. Once all decoded data has been processed into decoded video, the decoded video may be output.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 3 illustrates a flow chart of a process for performing variable length coding ("VLC") on video data in accordance with some embodiments of the present invention;

FIG. 4 illustrates a flow chart of a process for performing chunk partitioning in accordance with some embodiments of the present invention;

DETAILED DESCRIPTION OF THE VARIOUS EMBODIMENTS

Figure 1:
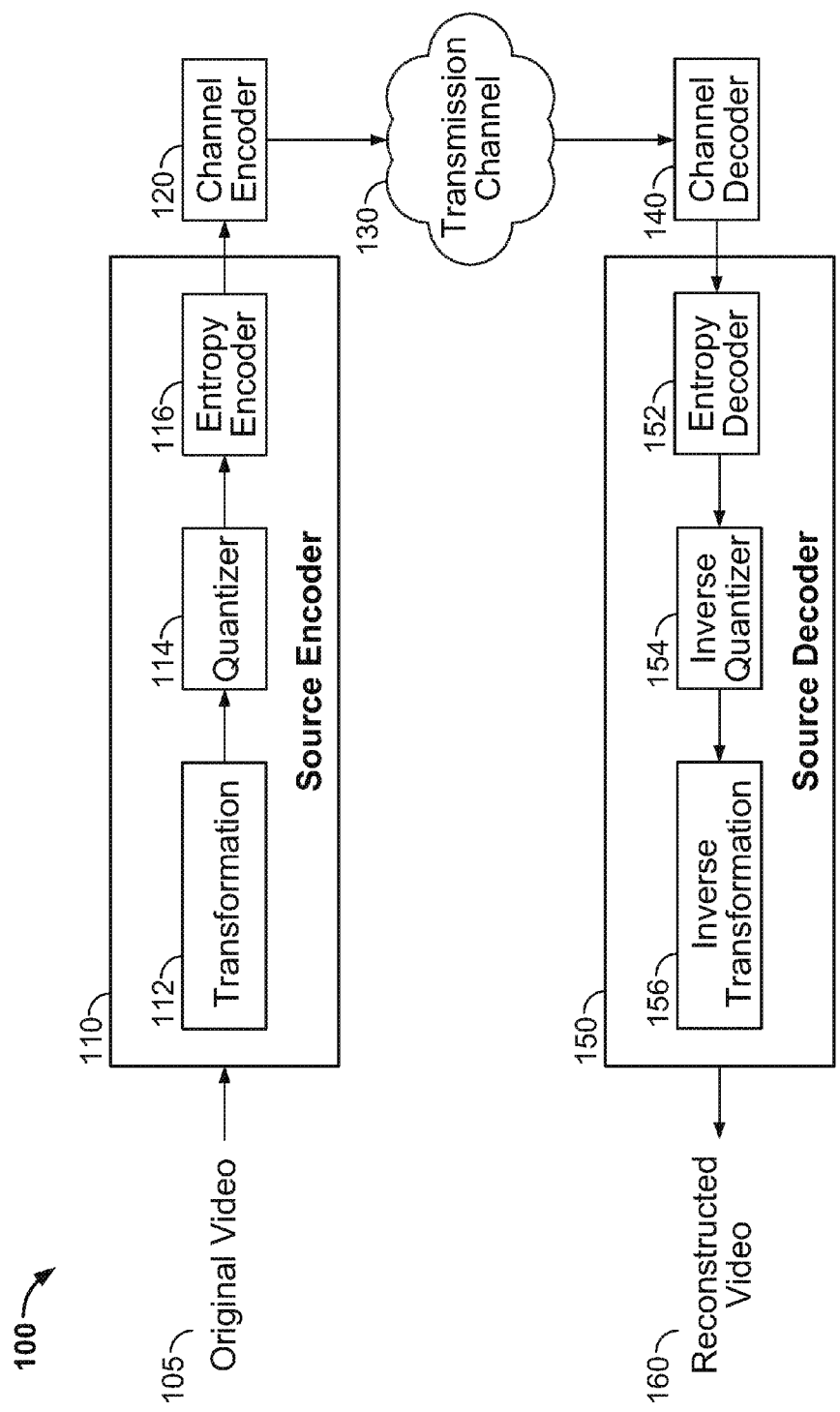
FIG. 1 illustrates an example of a video data compression system in accordance with some embodiments of the present invention.

FIG. 1 illustrates an example of a video data compression system 100 in accordance with some embodiments of the present invention. Source encoder 110 receives original video 105 as input and produces compressed video as output. Source encoder 110 reduces the entropy of original video 105, or the average number of bits required to represent an image in original video 105. Original video 105 may include any number of frames of video data encoded in any suitable video format—for example, MPEG-2, DIVX, H.264/MPEG-4 AVC, and VC-1. Source encoder 110 may include any suitable video compression circuitry, e.g., a processor, application-specific integrated circuit (ASIC), and/or field-programmable gate array (FPGA) that can run software configured to compress original video 105. The video compression circuitry of source encoder 110 may include an interface, e.g., a high-speed bus, between the processor and a memory that is used to buffer data before, after, and/or during video data compression. In some embodiments, the memory may be DDR SDRAM.

In order to achieve maximum video data compression, source encoder 110 includes any suitable number of sub-blocks that exploit redundancy in original video 105. These sub-blocks may be any suitable modules and/or areas of the video compression circuitry mentioned above. Source encoder 110 may include transformation 112, quantizer 114, and entropy encoder 116. Transformation 112 decorrelates and/or decomposes image data within a single frame of original video 105 in order to reduce and/or eliminate interpixel redundancy. For example, transformation 112 may perform a Haar wavelet transformation on original video 105. Transformation 112 may also calculate motion information between frames of original video 105. For example, transformation 112 may calculate motion information may include motion vectors, interpolated motion pixels, and/or motion magnitude. Transformation 112 may also perform a color space conversion on original video 105. In other embodiments, transformation 112 performs a lossless operation on original video 105. Transformation 112 outputs transformed original video to quantizer 114.

Quantizer 114 compresses the range of values in the transformed original video in order to aid entropy encoder 116 in performing video data compression. Compressing the range of values discards redundant data (e.g., psychovisually redundant data) in the transformed original video without introducing noticeable visual artifacts. Quantizer 114 may perform quantization on the transformed original video based at least in part on a quantization parameter (hereinafter "QP"). The quantization parameter determines step size in calculations performed by Quantizer 114 and regulates how much spatial detail is preserved in the transformed original video. The step size may be a rounding parameter that determines the precision of the result of the calculations. In some embodiments, quantization is performed as part of transformation 112. For example, transformation 112 may transform original video 105 in the spatial domain into quantization coefficients in the frequency domain using a discrete cosine transformation (hereinafter "DCT") or wavelet transformation. This transformation may produce quantization error, which are coefficient correction values for respective quantization coefficients. Quantization block 114 outputs the quantized video data and/or the transformed original video to entropy encoder 116.

Entropy encoder 116 compresses the quantized video data and/or the transformed original video (hereinafter the "compressed data") using its knowledge of the operations performed by transformation 112 and quantizer 114. This compression may be achieved by VLC. The VLC may separately compress the AC and DC values of the transformed original video. The DC values may be coded by differential pulse code modulation (hereinafter "DPCM"), or any other suitable compression algorithm. More detailed implementations of VLC are discussed below with respect to FIG. 3.

In some embodiments, entropy encoder 116 manages the data flow of the bitstream that includes the quantized video data and/or the transformed original video. For example, entropy encoder 116 may partition data blocks in the bitstream, assign data to the blocks, and code the offset of these blocks into headers such that the decoder can quickly locate the decodable positions in the compressed data during parallel decoding. More detailed implementations of this partitioning are discussed below with respect to FIG. 4.

In some embodiments, entropy encoder 116 increases efficiency of the encoding and/or decoding process by allocating space in the bitstream for quantization errors associated with quantization coefficients produced during operation of quantizer 114. In some embodiments, entropy encoder 116 layers the quantization errors according to a priority scheme. In addition, entropy encoder 116 may organize the compressed data within blocks of data to maximize the use of space within the bitstream. For example, entropy encoder 116 may write compressed quantization errors and/or other compressed quantization errors from VLC in the data blocks in a particular order and/or split up the data such that unused space in particular blocks are filled. These layering and data packing techniques may increase the overall throughput of the decoder with respect to memory and/or storage access during the encoding and/or decoding process. More detailed implementations of these layering and data packing techniques are discussed below with respect to FIGS. 5-10. Entropy encoder 116 outputs compressed data to channel encoder block 120.

Channel encoder 120 includes any suitable hardware and/or software that is configured to apply any suitable channel coding techniques to the compressed data, including but not limited to any suitable linear block coding and/or convolution coding such as low-density parity check coding or Viterbi coding. Channel encoder 120 transmits encoded data over transmission channel 130. Transmission channel 130 includes any suitable transmission medium, such as a wired or mobile communications network. Such communications networks may include one or more communications paths, such as, a satellite path, a fiber-optic path, a cable path, a path that supports internet communications (e.g., IPTV), free-space connections (e.g., for broadcast or other wireless signals), or any other suitable wired or wireless communications path or combination of such paths. Transmission network sends the compressed data to channel decoder 140. Channel decoder 140 may include any suitable hardware and/or software that is configured to apply any suitable channel decoding techniques to received data. These decoding techniques may be mirrored to the encoding techniques of channel encoder 120 mentioned above. Channel decoder 140 outputs compressed data to source decoder 150.

Source decoder 150 includes video decompression circuitry substantially similar to the circuitry discussed with respect to source encoder 110. Source decoder 150 includes any suitable number of sub-blocks that perform inverse operations of the sub-blocks in source decoder 150 on the compressed data it receives. The compressed data may be an input bitstream. These sub-blocks may be any suitable modules and/or areas of the video compression circuitry mentioned above. In some embodiments, source decoder 150 may include inverse transformation 156, inverse quantizer 154, and entropy decoder 156. Each of these sub-blocks may operate on portions of the compressed data in parallel. For example, entropy decoder block 156 may operate on several blocks of the compressed data at once. In some embodiments, source decoder 150 may determine decodable points within an input bitstream by reading header information in the input bitstream and calculating the offset for data blocks. In addition, in some embodiments source decoder 150 may rearrange blocks of data in order to reconstruct the frames of video originally compressed by source encoder 110. The decoding performed by source decoder may be performed on multiple portions of the bitstream at once and/or in different (e.g., opposing) directions, and may stop based on conditions related to the boundaries of the data blocks and/or decodable points. More detailed implementations of these decoding techniques are discussed below with respect to FIGS. 11 and 12.

Figure 2:
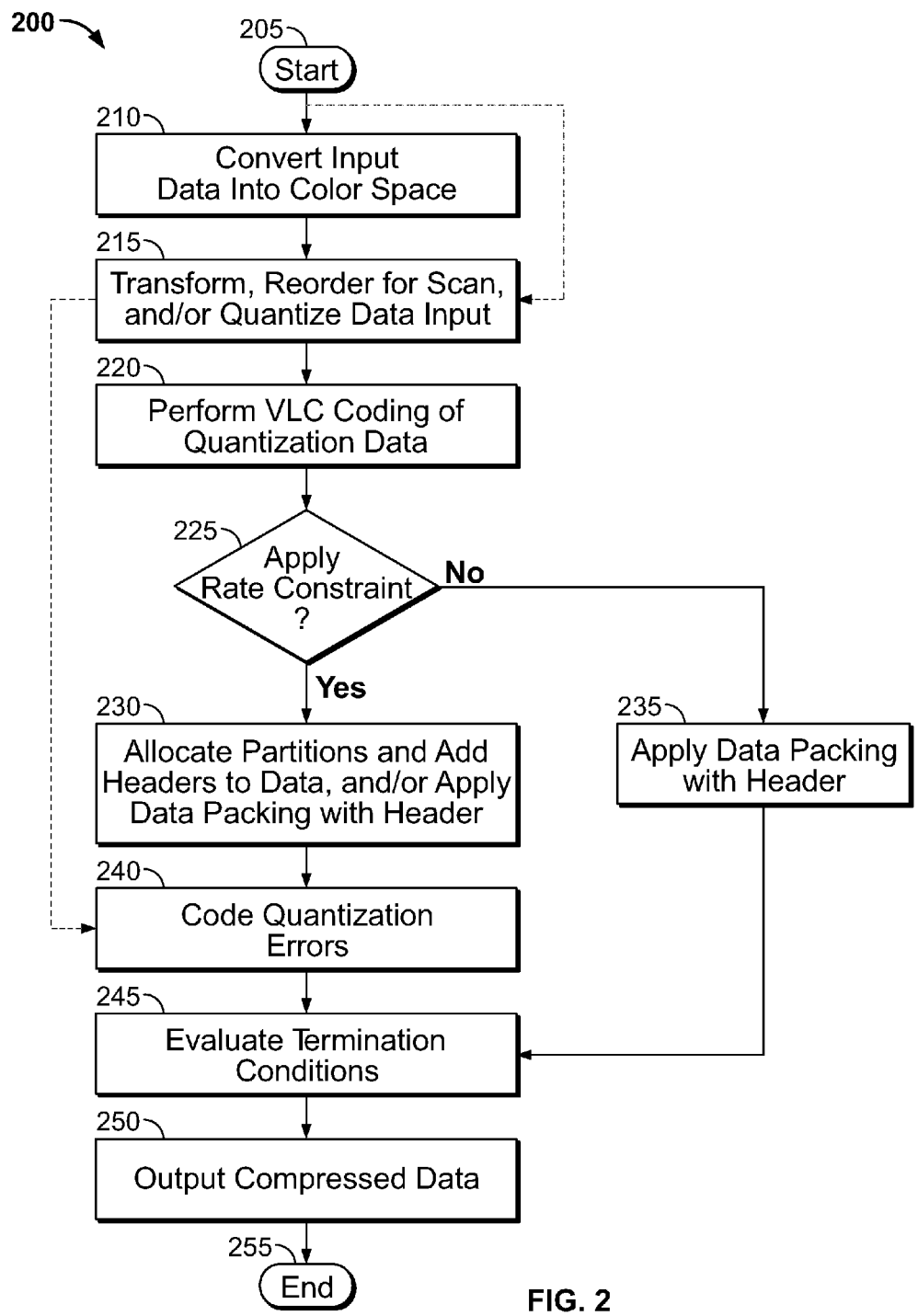
FIG. 2 illustrates a flow chart of a process for compressing video in accordance with some embodiments of the present invention.

FIG. 2 illustrates a flow chart of a process 200 for compressing video in accordance with some embodiments of the present invention. Process 200 may be performed by hardware such as that mentioned with respect to source encoder 110 (FIG. 1). At 205, Process 200 begins. In some embodiments, the input to process 200 is eight sets of 4×4 data blocks—e.g., eight sets of 4×4 matrices of coefficients representing the luma and chroma values of a block of uncompressed video, such as original video 105 (FIG. 1). These blocks each contain sixteen 8-bit intensity values. In embodiments where lossless compression is required (e.g., when QP=1), process 200 may proceed directly from 205 to 215. Otherwise, process 200 advances to 210. At 210, input data may be converted from one color space to another. For example, at 210 input data may be converted from ARGB(8:8:8:8) format to AYUV(8:8:8:8) format, or vice versa. In such embodiments, a revised version of the reversible conversion adopted in the JPEG2000 may be used. The conversion may be governed by the following equations, using standard bit-wise operators:

$$Y=[R+(G<<1)+B]>>2; \quad (1)$$

$$U=(B-G+255+x\,\%2)>>1; \quad (2)$$

$$V=(R-G+255+y\,\%2)>>1; \quad (3)$$

$$G=[(Y<<1)+255+x\,\%2+y\,\%2-U-V]>>1; \quad (4)$$

$$R=(V<<1)+G-255-x\,\%2; \quad (5)$$

$$B=(U<<1)+G-255-y\,\%2; \quad (6)$$

where Y, U, and V are luma and chroma components, G, R, and B are red, green, and blue components, and (x,y) is the position of the current pixel. The values for Y, U, V, R, G, and B, may be 8 bits, 32 bits, 64 bits, 128 bits, 256 bits, or any suitable size. Also at 210, pixels in the YUV 4:2:2 (or UY'VY") format may be converted to the AYUV(8:8:8:8) format using the substitutions A=Y' and Y=Y'". Once the color space conversion performed in 210 is complete, process 200 may advance to 215.

At 215, the converted 4×4 sets of data produced in 210 are transformed, reordered for scanning, and/or quantized. The operations at 215 may be performed as described with respect to transformation 112 and quantizer 114 (FIG. 1). In some embodiments, a transformation may be performed on the 4×4 sets of data. For example, a reversible Haar wavelet transform may be performed on the 4×4 sets of data. Such a transform may compact the energy of the data into the top left corner of the matrix representing the 4×4 sets of data. In some embodiments, this transform may be performed both vertically and horizontally on 4×1 and 1×4 blocks of the 4×4 sets of data, respectively. This transform may be governed by the following equation, using standard bit-wise operators:

$$(a,b,c,d)=([a+b+c+d+2]>>2,$$

$$[a+b-c-d]>>1,$$

$$[a-b],$$

$$[c-d]). \quad (7)$$

while the reverse transform is governed by the following equation, using standard bit-wise operators:

$$(x,y,z,p)=[(x-(\{((z+p)>>1)*2-y*2-z*3-p+2\}>>2)],$$
$$[(x-(\{((z+p)>>1)*2-y*2-z*3-p+2\}>>2)-z],$$
$$[(x-(\{((z+p)>>1)*2-y*2-z*3-p+2\}>>2)+$$
$$((z+p)>>1)*2-y-z],(x-(\{((z+p)>>1)*2-y*2-$$
$$z*3-p+2\}>>2)+((z+p)>>1)*2-y-z]. \quad (8)$$

This transform may increase the bit-width of certain data in the 4×4 sets of data. For example, the bit-width of each piece of data in the 4×4 sets of data may be 8 bits, but after the transform is applied the data in the 4×4 sets of data have the following bit-width:

$$\begin{matrix} 8 & 9 & 9 & 9 \\ 9 & 10 & 10 & 10 \\ 9 & 10 & 10 & 10 \\ 9 & 10 & 10 & 10 \end{matrix} \quad (9)$$

In some embodiments, the transform may produce sets of AC coefficients and DC coefficients for each 4×4 set of data. These sets of coefficients may be split between separate 4×4 sets of data, or may be combined within the same 4×4 set of data. Further, other wavelet transforms may be applied to the 4×4 sets of data, such as a Walsh transform, a discrete cosine transform, or any other suitable transform.

The transformed 4×4 sets of data may be reordered within the sets so that the coefficients are scanned in a more advantageous order during the remainder of process 200. This reordering may allow for a higher compression ratio and/or reduced loss of information due to compression. For example, a transformed 4×4 set of data that is originally represented in a matrix with numbered coefficients in the following manner:

$$\begin{matrix} 0 & 1 & 2 & 3 \\ 4 & 5 & 6 & 7 \\ 8 & 9 & 10 & 11 \\ 12 & 13 & 14 & 15 \end{matrix} \quad (10)$$

may be reordered to the following matrix:

$$\begin{matrix} 0 & 4 & 5 & 6 \\ 1 & 7 & 8 & 10 \\ 2 & 9 & 11 & 13 \\ 3 & 12 & 14 & 15 \end{matrix} \qquad (11)$$

In some embodiments, this reordering may allow coefficients with higher magnitude to be moved to the beginning of the scan order, assuming the scan order starts in the top left of the 4×4 set of data and proceeds to the right.

The reordered sets of 4×4 data may be quantized. In some embodiments, the AC coefficient in the 4×4 sets of data is quantized through division by a factor related to QP. For example, when QP is 2 or 4, an AC coefficient 'C' is quantized to coefficient $C_q$ according to the following equation:

$$C_q = \operatorname{sign}(C) * [|C| >> qpb] \qquad (12)$$

Where sign(C)=0 if C is equal to 0, sign(C)=1 if C is greater than 0, sign(C)=−1 if C is less than 1, and qpb=log$_2$(QP). In some embodiments, the division factor qpb is increased for AC coefficients that are towards the bottom right corner of the 4×4 data sets. For example, the AC coefficients may be divided into 3 levels. The AC coefficient with an index of 0 may not be quantized, the AC coefficients with an index of 1 through 6 in the 4×4 data sets may be quantized by calculating qpb using QP, while the AC coefficients with an index from 7 to 15 may be quantized by calculating qpb using 2*QP. These index positions may refer to the positions of the coefficients in a matrix representation of a 4×4 data set, such as the numbering shown in matrix 10. In addition, the DC coefficients may be quantized similarly to the AC coefficients as described above. In other embodiments, the DC coefficients are not quantized. Once the quantized coefficients are calculated, the quantization error may be calculated. In some embodiments, the quantization error is calculated as the remainder of the division described above. In some embodiments, this remainder is represented as either being positive or negative according to the value of the coefficient before quantization. In some embodiments, the quantization errors is associated with their respective coefficients—for example, the quantization error may be associated with a position in a data structure representing a 4×4 data set, such as a matrix. Once transformation, reordering, and/or quantization is complete, process 200 may advance to 220.

At 220, the transformed, reordered, and/or quantized 4×4 sets of data are coded using VLC. The VLC may separately compress the AC and DC coefficients, as will be described now with respect to FIG. 3. Descriptions of 225, 230, 235, 240, 245, and 250 are continued after description of FIG. 3.

FIG. 3 illustrates a flow chart of a process 300 for performing the VLC on video data in accordance with some embodiments of the present invention. At step 320, process 300 begins. At step 320, the DC coefficient values are coded. In some embodiments, this coding is via DPCM. For example, the difference between DC coefficients of neighboring blocks (e.g., blocks located spatially adjacent to a block in a frame of video data) may be coded based on the absolute value of the DC coefficient. Assuming the initial DC coefficients are represented in fixed 8-bit notation, the differences in DC coefficients may be coded according to the following table, where the 'x' characters cycle through binary representations of '0' to 'N', where N is the number corresponding to the binary representation of all '1' bits in place of 'x' characters in the VLC code, and s is a sign bit.

TABLE 1

| Range of Abs (DC difference) | VLC code |
|---|---|
| 0 | 000 |
| 1, 2 | 1xs |
| 3-6 | 001xxs |
| 7-14 | 010xxxs |
| 15-46 | 0110xxxxxs |
| 47-255 | 0111xxxxxxxxs |

For example, if abs(DC difference)=14, the appropriate VLC code is '010111'. The coding scheme for the DC coefficients in table 1 assumes that the DC coefficients range from −255 to 255. Once all of the DC values are coded in the 4×4 data sets, process 300 may advance to 330.

At 330, the pattern of the AC is detected. This pattern may be used to more efficiently encode the AC coefficients during VLC. In some embodiments, the AC coefficients are categorized into 4 patterns: pattern 1 may be that the AC coefficients have a threshold amount of trailing zero bits, pattern 2 may be that the AC coefficients have a threshold amount of trailing items within the range of [−1, 1], pattern 3 may be that the AC coefficients have a threshold amount of trailing items within the range of [−4, 4], and pattern 4 may be that the AC coefficients do not meet a threshold energy compactness. In some embodiments, the threshold amount of trailing zero bits in pattern 1 may be a threshold number of zeros in the AC coefficients—for example, more than 2, 3, 4, 5, or any suitable threshold number of trailing zeros. In some embodiments, pattern 1 is determined by counting the number of consecutive zeros in the AC coefficients. In other embodiments, The threshold amount of trailing items in patterns 2 and 3 may be a threshold number of instances of values within a defined range or set in the AC coefficients. For example, the AC and DC coefficients in a 4×4 data set may include the values 255, 115, −95, 4, 0, 1, 1, 1, −1, 1, 0, 1, 0, −1, 0, and 0. This pattern includes a significant number of instances of trailing 1's (i.e., coefficients that are either 1 or −1). In some embodiments, the threshold number of instances deemed to be significant are 1, 2, 3, 5, 10, 20, or any suitable threshold number of instances. In some embodiments, this pattern is detected through a search of the AC coefficients, such as any suitable string searching algorithm. Finally, the threshold energy compactness in pattern 4 may be a defined range of values, such as [−255, 255], [−511, 511], or any other suitable range. In some embodiments, pattern 4 is determined by comparing an AC coefficient to the defined range. Once the pattern of the AC coefficients has been detected, the pattern may be coded into the bitstream of VLC codes. In some embodiments, this coding is achieved by a two bit number corresponding to the pattern numbers discussed above. For example, if an AC coefficient falls within pattern 1, the pattern '01' may be coded into the VLC codes to proceed the VLC version of the AC coefficient.

Once the pattern of the AC coefficients has been detected, process 300 may proceed to 340. At 340, the AC coefficients may be coded using VLC. In some embodiments, the VLC used to encode a particular AC coefficient may be based on the pattern of that AC coefficient determined at step 330. In addition, the order in which the AC coefficients or bits within the AC coefficients are encoded using VLC may be based on the pattern of that AC coefficient determined at step 330. In some embodiments, if the AC coefficients fall within patterns 2 or 3, the trailing items may be coded first according to the following table, where the 'x' characters cycle through binary representations of '0' to 'N', where N is the number corresponding to the binary representation of all '1' bits in place of 'x' characters in the VLC code.

TABLE 2

| Trailing Item | VLC code |
|---|---|
| 0, 1 | 0x |
| 2, 3 | 10x |
| 4-7 | 001xx |
| 8-15 | 111xxx |

This coding scheme for the trailing items in table 2 assumes that the trailing items range from 0 to 15. In some embodiments, after the trailing items are coded, the remaining portions of the AC coefficient is coded according to the following tables, where the 'x' characters cycle through binary representations of '0' to 'N', where N is the number corresponding to the binary representation of all '1' bits in place of 'x' characters in the VLC code, and 's' is a sign bit. The following table is for AC coefficients that are in the range of −1 to 1:

TABLE 3

| Range of Abs (AC remainder) | VLC code |
|---|---|
| 0 | 0 |
| 1 | 1s |

The following table is for AC coefficients that are in the range of −4 to 4:

TABLE 4

| Range of Abs (AC Portion) | VLC code |
|---|---|
| 0 | 000 |
| 1 | 1s |
| 2 | 010s |
| 3, 4 | 011xs |

Finally, the following table is for AC coefficients that are in the range of −511 to 511:

TABLE 5

| Range of Abs (AC Portion) | VLC code |
|---|---|
| 0 | 000 |
| 1 | 001s |
| 2-5 | 01xxs |
| 6-9 | 100xxs |
| 10-17 | 101xxxs |
| 18-33 | 110xxxxs |
| 34-65 | 1110xxxxxs |
| 66-129 | 11110xxxxxxs |
| 130-511 | 11111xxxxxxxxxs |

The coding in tables 3, 4, and 5 assume that the initial AC coefficients are represented in fixed 8-bit notation. In some embodiments, the 4×4 sets of data may be represented in fixed 11-bit notation, and different coding schemes may need to be applied. Such coding schemes are detailed in U.S. Provisional Application No. 61/112,027, filed Nov. 6, 2008, which is hereby incorporated by reference herein in its entirety. In some embodiments, the AC coefficients are tested for all four patterns, and different coding schemes may be used for the trailing items identified in each pattern. Once the AC values are coded, process 300 advances to step 360 and ends.

Returning to FIG. 2, after VLC coding is completed at 220, process 200 advances to 225. At 225, it is determined whether there is a rate constraint. The rate constraint is a limit set on the maximum allowable bits as a ratio of the total bits of original data versus compressed data. For example, if there are 1000 bits of original video data, a rate constraint of ½ specifies that the compressed number of bits cannot exceed 500 bits. In some embodiments, the rate constraint may be detected by an input to the coding algorithm, such as a flag variable or signal processed by source encoder 110 (FIG. 1). If there is a rate constraint, process 200 may advance to step 230. If there is not a rate constraint, process 200 may advance to step 235.

At step 230, partitions in the coded bitstream are allocated for each of the eight sets of 4×4 data blocks. Header information may then be added to the coded bitstream that detail the positions of the partitions. In some embodiments, these partitions may enhance data bandwidth resources, as the decoder will be able to quickly locate decodable positions in the received bitstream. This partitioning scheme and header structure will be discussed now with respect to FIG. 4. Descriptions of 235, 240, 245, and 250 are continued after description of FIG. 4.

FIG. 4 illustrates a flow chart of a process 400 for performing chunk partitioning in accordance with some embodiments of the present invention. At step 420, process 400 begins. At 420, the space needed to code the incoming data blocks into partitions is allocated. In some embodiments, this allocation requires a determination of the total amount of space occupied by each set of 4×4 data. In other embodiments, this allocation requires a calculation of the data burst size needed in hardware to process each set of 4×4 data. This data burst size may be determined based on the bandwidth of a data bus in the processor or memory associated with the processor in the video compression circuitry of source encoder 110 (FIG. 1). In some embodiments, this determination is made by counting the total number of bits in the AC and DC coefficients, as well the trailing items, in each set of 4×4 data. The amount of space for the partitions and/or data bursts may then be chosen to a standard amount of space rounded up from the total number of bits, such as 32 bytes, 64 bytes, 96 bytes, 128 bytes, or any suitable standard block size. In some embodiments, the amount of space is determined to be the largest burst size possible such that each bit in the data bursts includes compressed video data (i.e., compressed AC and DC coefficients as well as quantization errors, and no padded zeros).

Process 400 may advance to step 430. At step 430, the total number of bytes per partition and/or data burst may be determined. In some embodiments, this space is determined using a greedy algorithm. The number of blocks in the partition and/or data burst may be the total number of sets of 4×4 data, such as 8, 16, 32, 64, 128, or any suitable number of sets. In some embodiments, the number of allocated bytes $A_i$ per block $i=1, 2, \ldots, n$, is calculated using the following equation, where C is the total bytes available in the partition and/or data burst space, H is the number of bytes allocated to coding the header in the partition space, and $R_1, R_2, \ldots, R_n$ may be the number of bytes requested for each block of data (i.e., each 4×4 set of data):

$$A_i = \text{Round}\left(\frac{R_i}{\sum_{j=1}^{n} R_j}(C - H - n)\right) + 1, i = 1, 2, \ldots n \quad (13)$$

In some embodiments, the Round( ) function rounds the number of bytes up. In other embodiments, the Round( ) function rounds the number of bytes down. In some embodiments, local adjustments may be performed between partitions to tweak the amount of bytes $A_i$ for each partition. In addition, in some embodiments a look-up-table may be used to calculate the number of allocated bytes $A_i$. After the number of bytes per partition and/or data burst is determined, process 400 advances to 440.

At 440, the spacing information determined at 430 is coded into the data header of the space allocated for all partitions and/or data bursts in the coded bitstream. These codes may be assigned based on the total amount of space allocated to the partitions and/or data bursts, as well as the number of bytes allocated for the coding of the header. Such coding schemes are detailed in U.S. Provisional Application No. 61/112,027, filed Nov. 6, 2008, which is hereby incorporated by reference herein in their entirety. After the spacing information is coded into the header, process 400 advances to 450 and ends.

Returning to FIG. 2, at 235 a data packing scheme may be applied to coded bitstream. Data packing schemes will be discussed in detail with respect to FIGS. 9 and 10. Once data packing is applied to the coded bitstream, process 200 advances to 240. At 240, the quantization errors produced at 215 are coded into the bitstream. In some embodiments, the partitions and/or data bursts created at 230 or 235 are not entirely filled with compressed video data or header data. In these embodiments, coding quantization errors in the unused space may improve the quality of the video upon decoding, as well as maximize bandwidth resources, such as data burst size, during decoding. In addition, 230 and/or 235 quantization errors and AC and DC coefficients associated with each set of data such that parallel decoding of each may occur from opposite directions in the bitstream. A scheme for coding quantization errors into the bitstream is discussed now with respect to FIGS. 5-7. Descriptions of 240, 245, and 250 are continued after description of FIGS. 5-7.

Figure 5:
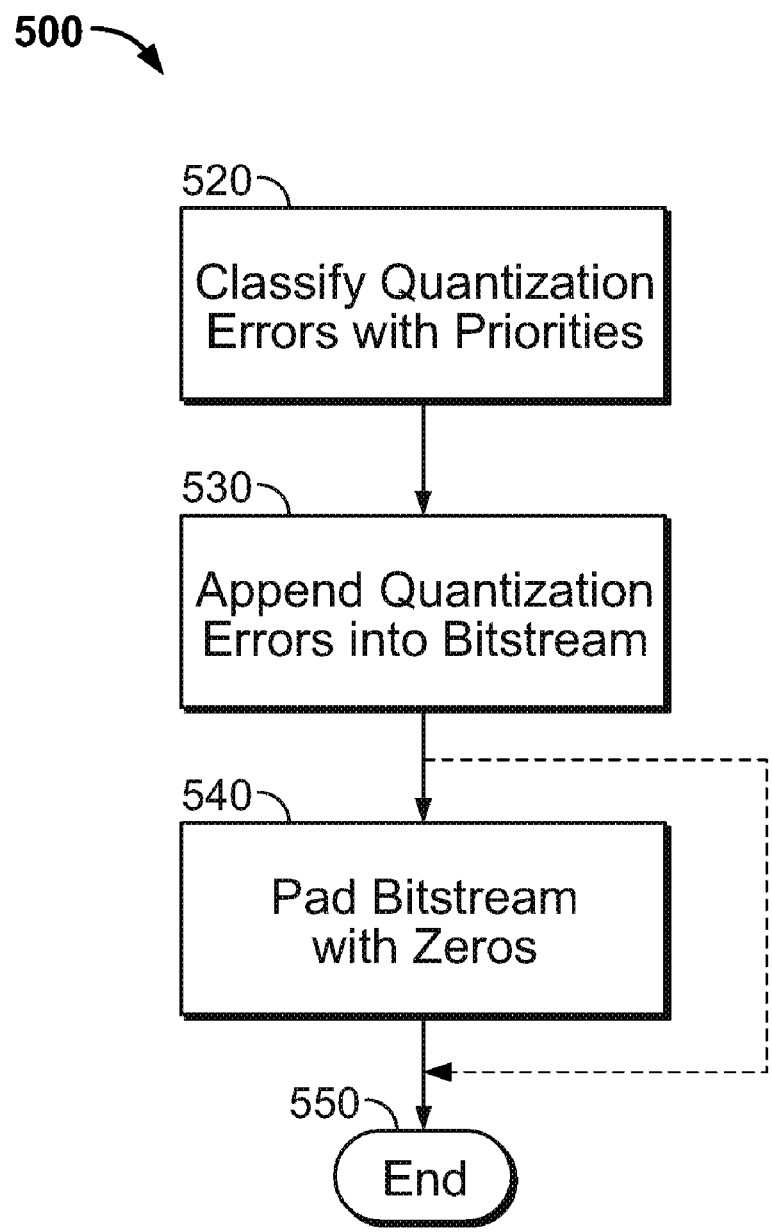
FIG. 5 illustrates a flow chart of a process for writing quantization errors to a bitstream with layered coding in accordance with some embodiments of the present invention.
Figure 6:
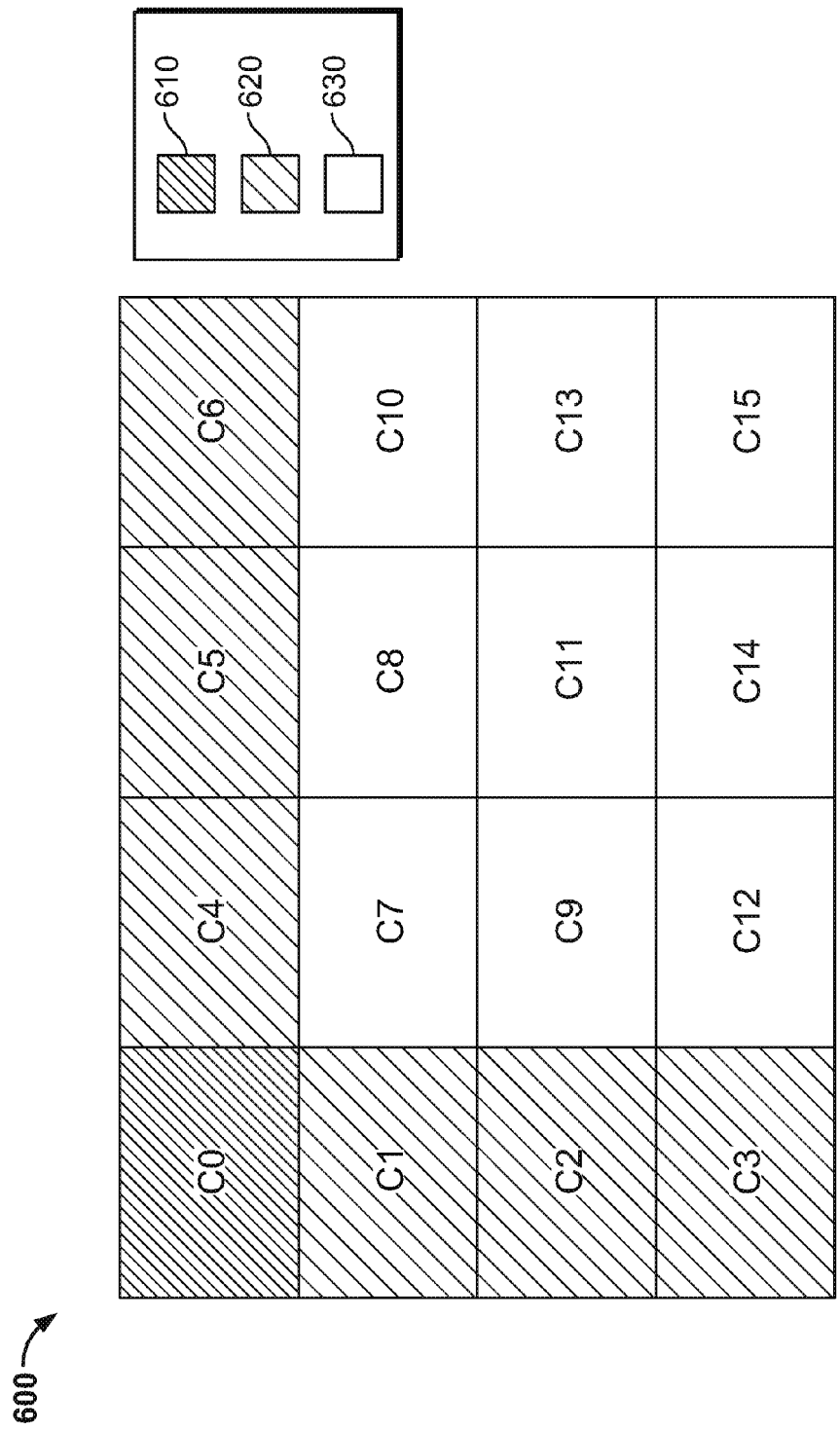
FIG. 6 illustrates an example of prioritized quantization error coefficients in accordance with some embodiments of the present invention.

FIG. 5 illustrates a flow chart of a process 500 for writing quantization errors to a bitstream with layered coding in accordance with some embodiments of the present invention. At step 520, process 500 begins. At step 520, quantization errors are classified with priorities and coded. In some embodiments, these priorities are based on the association between the quantization error and its associated coefficient in a data block. For example, quantization errors may be assigned priorities according to the position of their associated coefficient in a data structure representing a data block, such as a matrix representing a 4×4 data block. FIG. 6 illustrates an example of prioritized quantization error coefficients 600 in accordance with some embodiments of the present invention. In this example, the quantization errors represented by C0-C15 are associated with a position in a matrix representing a 4×4 data block. The quantization errors have been classified into three layers of priority—the first layer of priority includes quantization error C0, and is represented by shading 610, the second layer of priority includes quantization errors C1-C6, and is represented by shading 620, and the third layer of priority includes quantization errors C7-15, and is represented by shading 630. In some embodiments, priorities may be assigned to the quantization errors according to the amount of non-redundant information in the AC and DC coefficients associated with each quantization error. In some embodiments, quantization errors that are assigned a higher layer of priority are coded while quantization errors that are assigned a lower level of priority are not coded. For example, quantization errors assigned a priority of layer 1 may be coded using VLC, while quantization errors assigned a priority of zero are not coded.

In some embodiments, the quantization errors are coded according to a scheme in which it is assumed that the AC coefficients with an index of 1 through 6 in the 4×4 data sets are quantized by calculating qpb using QP, while coefficients with an index from 7 to 15 may be quantized by calculating qpb using 2*QP, as discussed with respect to step 215 of process 200 (FIG. 2). In addition, it is assumed that QP=2 or QP=4. Note that this scheme does not apply when QP=0, as quantization will not be applied to the video data in the first place and thus there will be no quantization error to code. If the quantization coefficient is 0, the following table is used to code the associated quantization error for the 1st through 6th AC coefficients (i.e., the coefficients with an index of 1 through 6 in the matrix representation of each 4×4 data set) when QP=2, where the 'x' characters cycle through binary representations of '0' to 'N', where N is the number corresponding to the binary representation of all '1' bits in place of 'x' characters in the VLC code, and 's' is a sign bit:

TABLE 6

| Abs (Quantization error) | VLC code |
| --- | --- |
| 0 | 0 |
| 1 | 1s |

Further, if the quantization coefficient is 0, the following table is used to code the associated quantization error for the 1st through the 6th AC coefficients when QP=4:

TABLE 7

| Abs (Quantization error) | VLC code |
| --- | --- |
| 0 | 00 |
| 1 | 1s |
| 2, 3 | 01xs |

Table 7 is also used to code the associated quantization error for the 7th through the 15th AC coefficients when the quantization error is 0 and QP=2. Further, if the quantization coefficient is 0, the following table is used to code the associated quantization error for the 7th through the 15th AC coefficients when QP=4:

TABLE 8

| Abs (Quantization error) | VLC code |
| --- | --- |
| 0 | 00 |
| 1 | 01s |
| 2, 3 | 10xs |
| 4-7 | 11xxs |

Further, if the quantization error is non-zero, the following table is used to code the associated quantization error for the 1st through 6th AC coefficients when QP=2:

TABLE 9

| Quantization error | VLC code |
| --- | --- |
| 0 | 0 |
| 1 | 1 |

Further, if the quantization error is non-zero, the following table is used to code the associated quantization error for the 1st through 6th AC coefficients when QP=4:

TABLE 10

| Quantization error | VLC code |
| --- | --- |
| 1 | 0 |
| 0 | 10 |
| 2 | 11 |

This coding scheme assumes that quantization error with a value of 3 will be represented as 2. Table 10 may also be used to code the associated quantization error for the 7th through 15th AC coefficients when the quantization error is non-zero and QP=2. Further, the following table may be used to code the associated quantization error for the 7th through 15th AC coefficients when the quantization error is non-zero and QP=4:

TABLE 11

| Quantization error | VLC code |
| --- | --- |
| 2, 3 | 0x |
| 1, 4 | 10x |
| 0, 5, 6, 7 | 11xx |

Returning to FIG. 5, one the quantization errors are classified and coded, process 500 may advance to 530.

At 530, the quantization errors are appended into the coded bitstream. In some embodiments, the coded quantization errors are filled into the partitions and/or data bursts in the coded bitstream in an order based on their associated priority layers. For example, quantization errors assigned a priority of layer 0 and layer 1 may be filled into the coded bitstream before quantization errors assigned a priority of layer 2. Depending on the space available for quantization errors in the coded bitstream, it is possible that quantization errors or portions of quantization errors are omitted in the coded bitstream. For example, a partition may have space for the quantization error assigned a priority of layer 0 and the quantization errors assigned a priority of layer 1, but not the quantization errors assigned a priority of layer 2. Further, in some embodiments, the quantization errors are coded in the least significant bits of a partition from right to left, such that the quantization errors with higher priorities are in the least significant bits, whereas the quantization errors with lower priorities are in the most significant bits. In some embodiments, appending the quantization error to the coded bitstream in this manner may allow parallel decoding of the compressed video data and the layered coded quantization error, which may increase overall throughput and maximize bandwidth resources of the encoder and/or decoder. An example of this coding scheme will be discussed below with respect to FIG. 7. After the quantization errors have been appended into the bitstream, process 500 may advance to 540.

At 540, the bitstream may be padded with zeros. This padding may occur when there is unused space in a partition of the bitstream after the compressed video data and the quantization errors are coded. In some embodiments, 540 may be not be performed if there is no unused space in the coded bitstream. Process 500 may then proceed to 550 and end.

Figure 7:
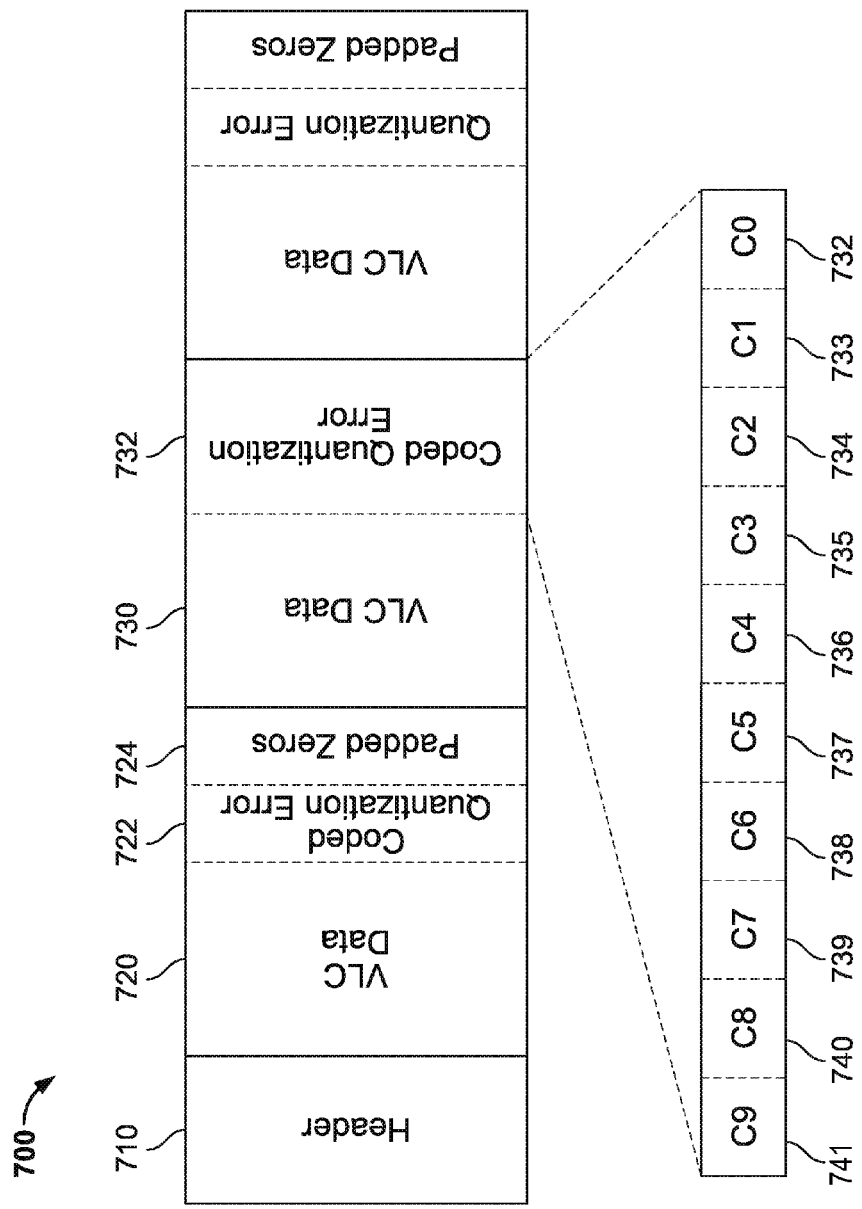
FIG. 7 illustrates an example of a compressed bitstream with layered coding for quantization errors in accordance with some embodiments of the present invention.

FIG. 7 illustrates an example of a compressed bitstream 700 with layered coding for quantization errors in accordance with some embodiments of the present invention. Compressed bitstream 700 includes coded header data 710, VLC codes 720 and 730, coded quantization error 722 and 730, and padded zero data 724. Coded header data 710 contains coded spacing information describing the boundaries of the partitions in compressed bitstream 700. In some embodiments, the spacing information may be coded according to process described with respect to 440 of process 400 (FIG. 4).

VLC codes 720, coded quantization error 722, and padded zeros 724 may form a first partition and/or data burst in compressed bitstream 700. Because the coded quantization error 722 did not take up all of the remaining space allocated to the partition and/or data burst after VLC codes 720 were written into the partition and/or data burst, the remaining space was filled with padded zeros 724 as described with respect to step 540 of process 500 (FIG. 5).

VLC codes 730 and coded quantization error 732 may form a second partition and/or data burst in compressed bitstream 700. A more detailed view of coded quantization error 722 is shown in quantization errors 732-736. Quantization errors 732-741 are organized such that quantization error 732, which has an associated priority of layer 0, is written in the least significant bits of coded quantization error 722, while quantization errors 733-738 and 739-741, which have priorities of layer 1 and layer 2 respectively, are written in the most significant bits of coded quantization error 722. In addition, quantization errors in positions C10, C11, C12, C13, C14, and C15 are not written into this partition, as there was no available space in the partition after coding VLC codes 730 and quantization errors 732-741. In some embodiments, quantization errors 733-741 are not of equal length. For example, quantization error 732 is significantly larger (i.e., has many more bits) than quantization errors 733-741.

Returning to FIG. 2, once the quantization errors are coded at 240, process 200 may advance to 245. Jumping back to 235, data packing may be applied to each of the eight sets of 4×4 data blocks. Data packing may pack each set of 4×4 data so that the decoder may quickly detect the starting points for decoding the compressed bitstream. In addition, data packing may arrange portions of VLC codes such that parallel decoding may occur from opposite directions in the bitstream. In some embodiments, data packing may be achieved by adding a header in front of the coded data to specify the offsets of the starting points for each block or partition of data. In other embodiments where a rate constraint is present, the constraint may be used for indicating starting points in the coded bitstream. A more detailed description of this data packing scheme is now described with respect to FIGS. 8-10. Descriptions of 245 and 250 are continued after description of FIGS. 5-7.

Figure 8:
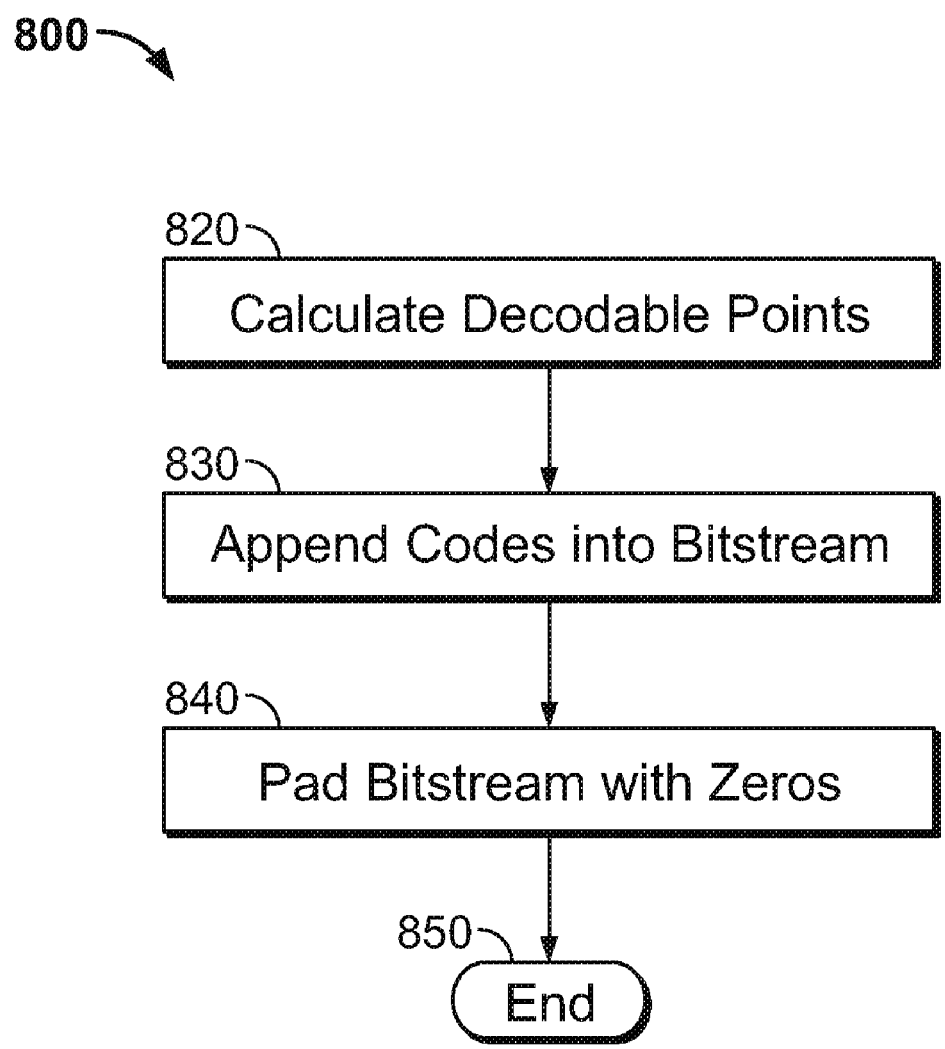
FIG. 8 illustrates a flow chart of a process for data packing in accordance with some embodiments of the present invention.

FIG. 8 illustrates a flow chart of a process 800 for data packing in accordance with some embodiments of the present invention. Process 800 is described with respect to embodiments where a rate constraint is not present. At step 820, process 800 begins. At step 820, the decodable points of the coded bitstream are calculated. The decodable points may be calculated based on the number of bytes per each 4×4 block of data. For example, a 4-bit code may be used to represent the number of bytes for each 4×4 block of data, where the 4-bit code represents 1 to 16 bytes. In some embodiments, a code larger than 4 bits is used to represent a larger number of bytes (e.g., a number of bytes greater than 16) required for the compressed video data, such as 5, 6, 7, 8, 16, 32, 64, 128, or any suitable number of bytes. In some embodiments, the number of bytes per each 4×4 block of data may be calculated by counting the number of total bytes of VLC codes required to represent the AC and DC coefficients, as well as the trailing items, in each 4×4 block. The VLC code representing the number of bytes may be assigned a code according to the following table:

TABLE 12

| Number of Bytes | VLC code |
| --- | --- |
| 1 | 0000 |
| 2 | 0001 |
| 3 | 0010 |
| 4 | 0011 |
| 5 | 0100 |
| 6 | 0101 |
| 7 | 0110 |
| 8 | 0111 |
| 9 | 1000 |
| 10 | 1001 |
| 11 | 1010 |
| 12 | 1011 |
| 13 | 1100 |
| 14 | 1101 |
| 15 | 1110 |
| Greater than 16 | 1111 |

Once the decodable points of the bitstream are calculated and coded, process 800 advances to 830. At step 830, the variable length codes for the video data (i.e., AC/DC coefficients and trailing items) are appended into the bitstream for each 4×4 set of data. If the variable length codes required to represent the 4×4 set of data is less than 16 bytes, all of the codes are appended into the bitstream. If the variable length codes required to represent the 4×4 set of data is greater than 16 bytes, a fixed-width method of coding is used to append the codes into the bitstream. Process 800 may then advance to 840.

At 840, it is determined whether the current bitstream is at the byte boundary of the space allocated for the sets of 4×4 data. If the byte boundary has been reached, the bitstream is padded with zeros until the byte boundary is reached. Once the byte boundary has been reached, process 800 proceeds to 850 and ends.

Figure 9:
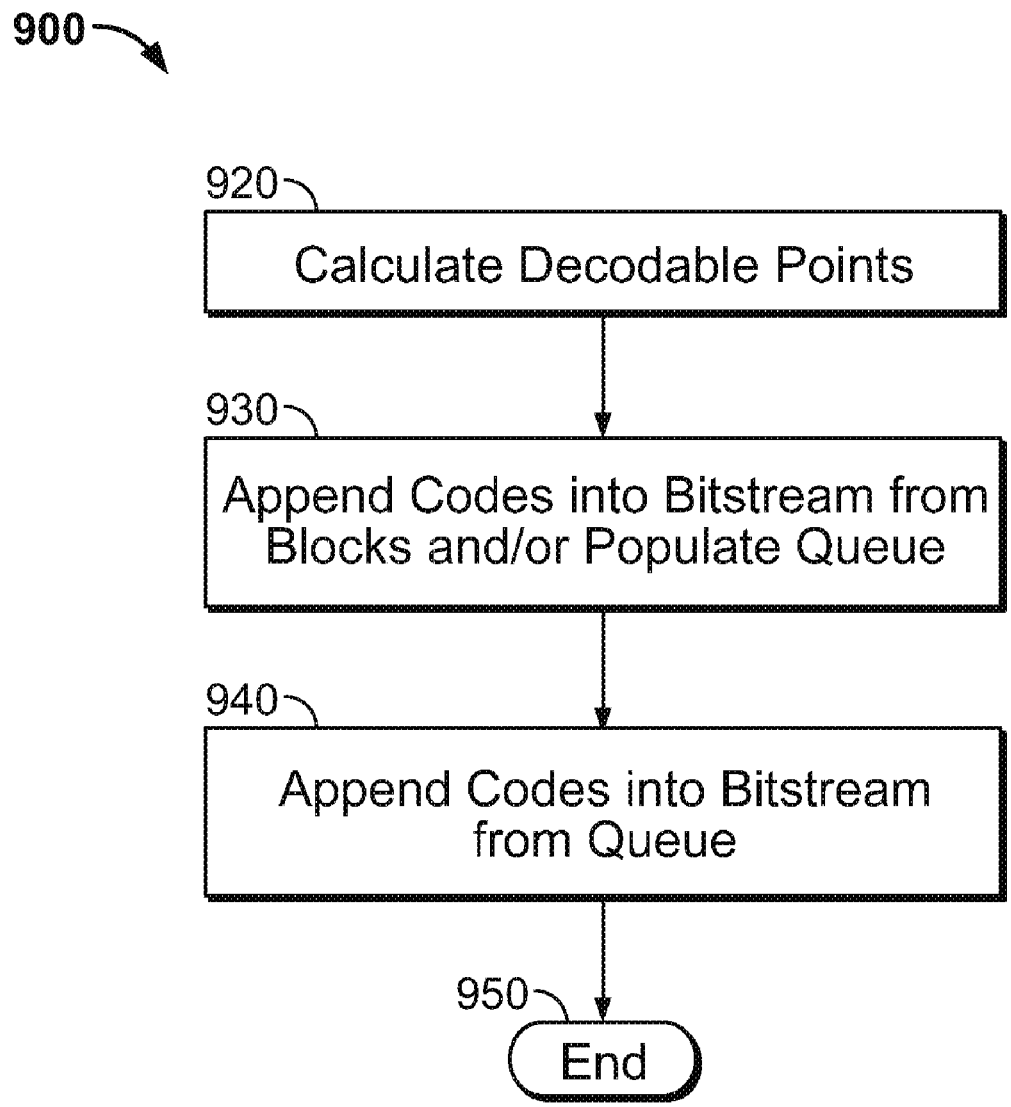
FIG. 9 illustrates a flow chart of a process for data packing in accordance with some embodiments of the present invention.

FIG. 9 illustrates a flow chart of a process 900 for data packing in accordance with some embodiments of the present invention. Process 900 is described with respect to embodiments where a rate constraint is present. In such embodiments, the length of the coded bitstream may be fixed after the video data has been coded with VLC, and thus can be used to aid in data packing. At step 920, process 900 begins. At step 920, decodable points of the coded bitstream may be calculated. Since the length of the coded bitstream is known, the decodable points may be evenly distributed. The amount of space allocated for each block may be calculated as the compression rate multiplied by the total number of blocks in the coded bitstream. Process 900 may advance to 930. At 930, the codes representing the compressed blocks of data may be appended into the bitstream. If the total number of bytes of the VLC codes required to represent the AC and DC coefficients, as well as the trailing items, in a block is less than the amount of space allocated for a particular block, the VLC codes may be appended into the bitstream. In some embodiments, zeros are padded into the bitstream into any unused space in these blocks. If the total number of bytes of the VLC codes is greater than the amount of space allocated for a particular block, the VLC codes may be written to the block until it is full. The remaining unwritten VLC codes for that block, including any partial VLC codes, may then be added to a queue. Once all of the blocks have been filled with their respective VLC codes, process 900 advances to 940.

At 940, the unwritten VLC codes from the queue are appended into unused space in the coded bitstream. A determination of whether there is unused space in a particular block may be made according to whether there are padded zeros in that particular block. Once it is determined that there is unused space in a particular block, the VLC codes from the queue are written in place of the padded zeros until the particular block is full of coded data. In some embodiments, a check is performed to determine whether the entirety of one of the unwritten VLC codes in the queue may be written to the data block. If there is not enough available space for an entire VLC code, the unwritten VLC code are saved in the queue, and next VLC code in the queue may be checked. In other embodiments, the VLC codes are written in the queue regardless of whether entire VLC codes fit in the queue. Once the unused space in a particular block has been filled with unwritten VLC codes, the next block in the bitstream may be examined. In addition, in some embodiments the VLC codes are written in reverse bit order (i.e., most significant bit swapped with the least significant bit, the second most significant bit swapped the second most least significant bit, etc.) and in a different coding scheme as compared to the VLC codes stored in normal bit order (i.e., standard binary representation). This coding scheme may allow the decoder to read the VLC codes appended from the queue in reverse bit order so that reverse-direction decoding is possible without knowing which data block the reversed VLC code belongs to. Further, this scheme may allow parallel decoding of the regular VLC codes and the VLC codes appended from the queue from opposite directions in the bitstream. Once all of the unused space in the blocks in the bitstream have been examined and filled with unwritten codes, process 900 may advance to step 950 and end.

Figure 10:
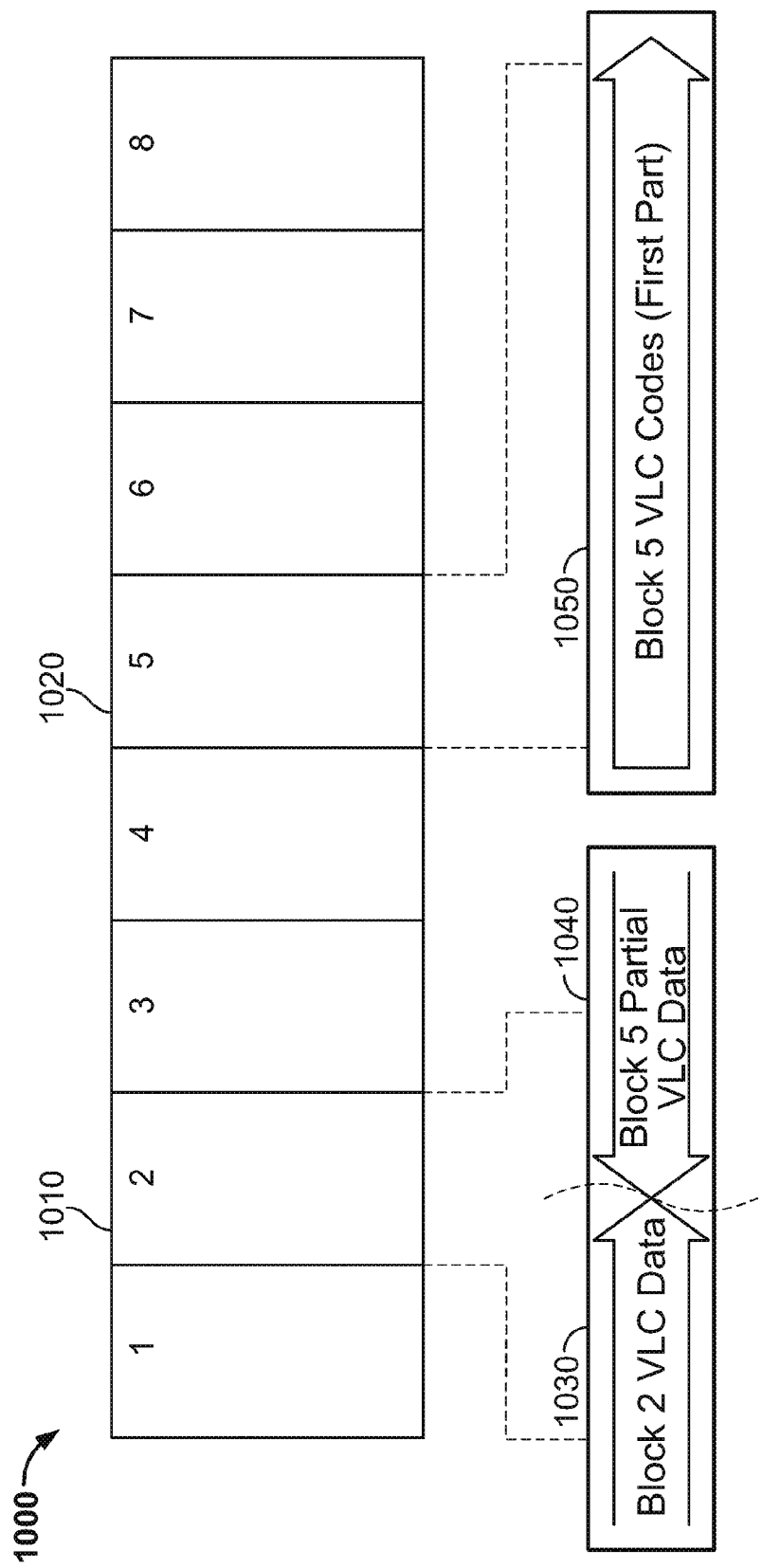
FIG. 10 illustrates an example of a compressed bitstream with data packing in accordance with some embodiments of the present invention.

FIG. 10 illustrates an example of a compressed bitstream 1000 with data packing in accordance with some embodiments of the present invention. Compressed bitstream 1000 includes 8 blocks of equal size, each corresponding to space allocated for the VLC codes associated with 4×4 sets of data. A more detailed view of data block 1010 is shown in VLC codes 1030 and 1040. VLC codes 1030 illustrates that all of the VLC codes for data block 1010 fit within the constrained space of data block 1010. VLC codes 1040 illustrates that a portion of the VLC codes for block 1020 was not able to be written into the constrained space of data block 1020. VLC codes 1040 was written into block 1040 in reverse bit order from a queue of unwritten VLC codes, such as that described with respect to process 900 (FIG. 9). In addition, a more detailed view of data block 1020 is shown in VLC codes 1050. VLC codes 1050 illustrate the first portion of the VLC codes for data block 5 is stored in regular bit order.

Returning to FIG. 2, 235 and 240 converge at 245. At 245, one or more termination conditions may be evaluated to determine whether the encoding process should end. In some embodiments, it may be determined that decoding should terminate because all of the AC and DC coefficients, trailing items, and quantization errors are coded, and there is still unused space in the bitstream. In such embodiments, the unused space may be padded with zero bits. In some embodiments, it may be determined that coding should terminate because the last coded piece of data has been written on the byte boundary of the last partition in the bitstream. Further, in some embodiments, it is determined that the coded piece of data currently being written to the bitstream will cross over the byte boundary of the last partition in the bitstream. In such embodiments, the portion of coded data that does not fit within the byte boundary may be discarded, and the encoding process is terminated. Process 200 may then advance to 250. At 250, the compressed data may be output. In some embodiments, this output may be a high speed memory interface, such as a DDR SDRAM memory bus. In other embodiments, the compressed data may be output as a data stream. Process 200 may then advance to 255 and end.

Figure 11:
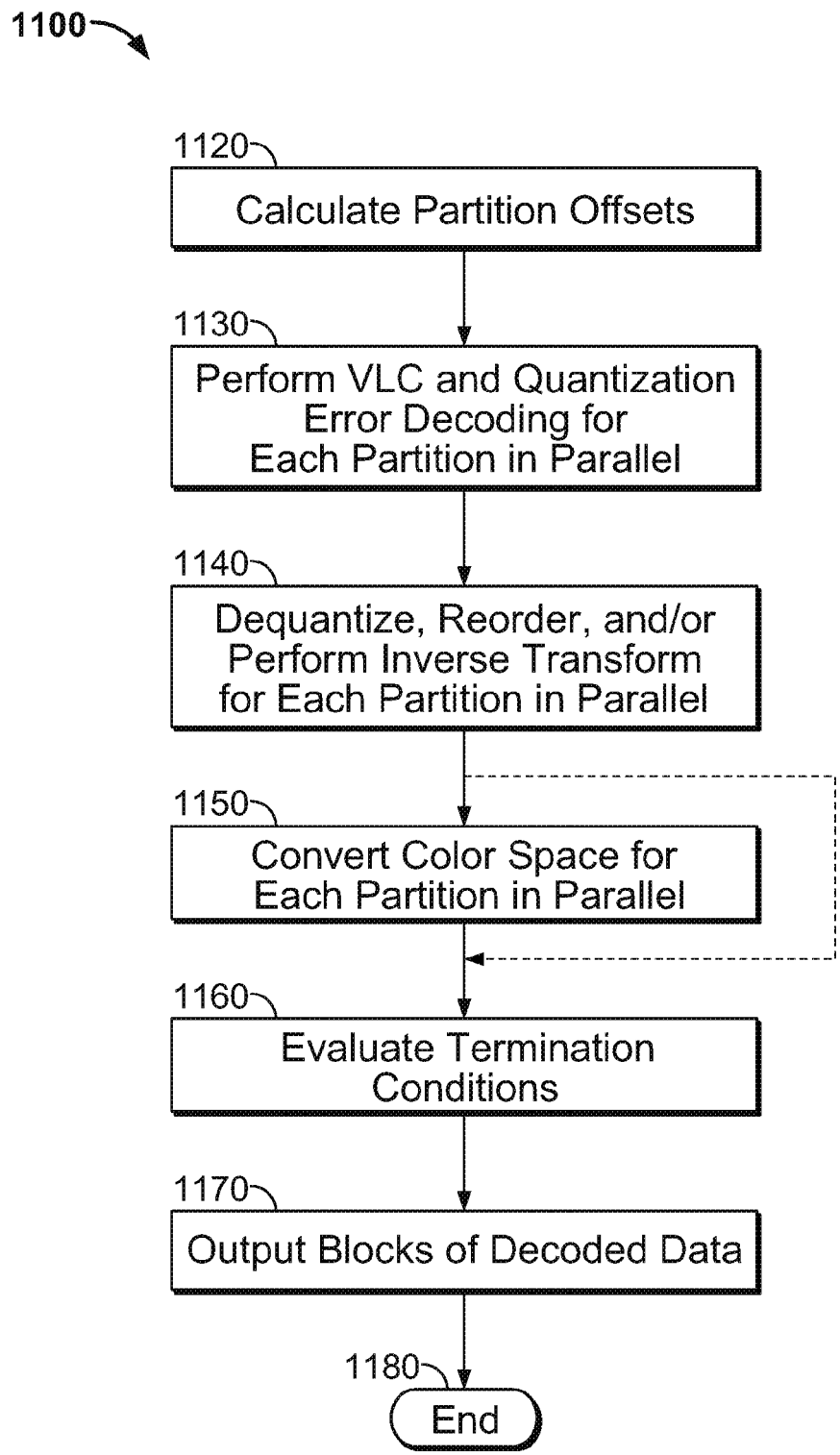
FIG. 11 illustrates a flow chart of a process for parallel decoding of a compressed bitstream with layered coding for quantization errors in accordance with some embodiments of the present invention.

FIG. 11 illustrates a flow chart of a process 1100 for parallel decoding of a compressed bitstream with layered coding for quantization errors in accordance with some embodiments of the present invention. In some embodiments, process 1100 may be performed by hardware such as that described with respect to source decoder 150 (FIG. 1). At step 1120, process 1100 begins. At step 1120, partition offsets in the received data are calculated. In some embodiments, the received data may be coded at 210, 215, 220, 225, 230, 240, 245 and 250 of process 200 (FIG. 2). In such embodiments, the location of partitions in the bitstream are determined according to header information encoded into the bitstream. This header information may be coded using the scheme described with respect to step 440 of process 400 (FIG. 4). Process 1100 may then advance to 1130. At 1130, VLC codes and quantization error are decoded in parallel for each partition. In some embodiments, the compression ratio is checked before decoding begins. This compression ratio may be encoded in the header information. If the compression ratio is zero, random data is output. If the compression ratio is one, uncompressed data may be output. Otherwise, the received data may be decoded as follows. The layered coded quantization error may be decoded starting with the quantization errors in the least significant bits of the partition at the same time that the VLC codes are decoded. In this manner, the layered coded quantization error is decoded in the opposite direction in the bitstream of the direction in which the VLC codes are decoded. In some embodiments, the layered coded quantization error may be decoded simultaneously with the VLC codes, effectively increasing the overall throughput of the decoder. The decoding process may examine the tables 1-11, and reconstruct the original data using a reverse look up. In some embodiments, the decoding of the quantization errors within a partition may be completed before the decoding of the VLC codes. In such embodiments, the decoder may match the decoded quantization errors with the associated decoded VLC codes. After all of the AC and DC coefficients, as well as their associated quantization errors are decoded, process 1100 may advance to 1140.

At 1140, the decompressed data may be dequantized, reordered, and run through an inverse transform. These operations may be substantially the reverse of the steps described at 215 of process 200 (FIG. 2). With respect to dequantization, if the quantization error is zero, then the dequantized data may be assigned a predetermined value. This predetermined value may signal that the dequantized data is an error and should be overlooked and/or compensated for when integrated into the decompressed video. In some embodiments, this predetermined value depends on the QP originally used to quantize the data. For example, if QP=2, than the predetermined value is 0, and if QP=4, then the predetermined value is 1. Otherwise, the predetermined value may signal that no quantization error needs to be applied to the dequantized data. Finally, in some embodiments, if the quantization error is non-zero, the dequantized value $C_r$ may be calculated according to the following equation, where $C_q$ is the quantization error, $qpb=\log_2(QP)$, and quant_error are the predetermined values described above:

$$C_r = \text{sign}(C_q) * [(|C| << qpb) + \text{quant\_error}] \quad (14)$$

Process 1100 may then advance to 1150. In some embodiments, process 1100 may bypass 1150 and advance to 1160.

At 1150, the dequantized data may be converted back into its original color space. In some embodiments, this conversion is achieved through the reverse transform of equation 8. Process 1100 may then advance to 1160. At 1160, termination conditions may be evaluated to determine whether decoding should end. In some embodiments, it may be determined that the decoding process should end because all of the AC and DC coefficients, as well their associated quantization errors, have been decoded. In some embodiments, it may be determined that the decoding process should end because the last coded piece of data has been decoded on the byte boundary of the last partition in the bitstream. Further, in some embodiments, it is determined that the piece of data currently being decoded will cross over the byte boundary of the last partition in the bitstream. It may be determined that this piece of data is not decodable, due to the prefix-oriented nature of VLC. In some embodiments, the decoder may output data to indicate that this data is an error and should be overlooked and/or compensated for when integrated into the decompressed video. Process 1100 may advance to 1170. At 1170, the compressed data may be output. In some embodiments, this output may be a high speed memory interface, such as a DDR SDRAM memory bus. In other embodiments, the compressed data may be output as a data stream. Process 1100 may then advance to 1180 and end.

Figure 12:
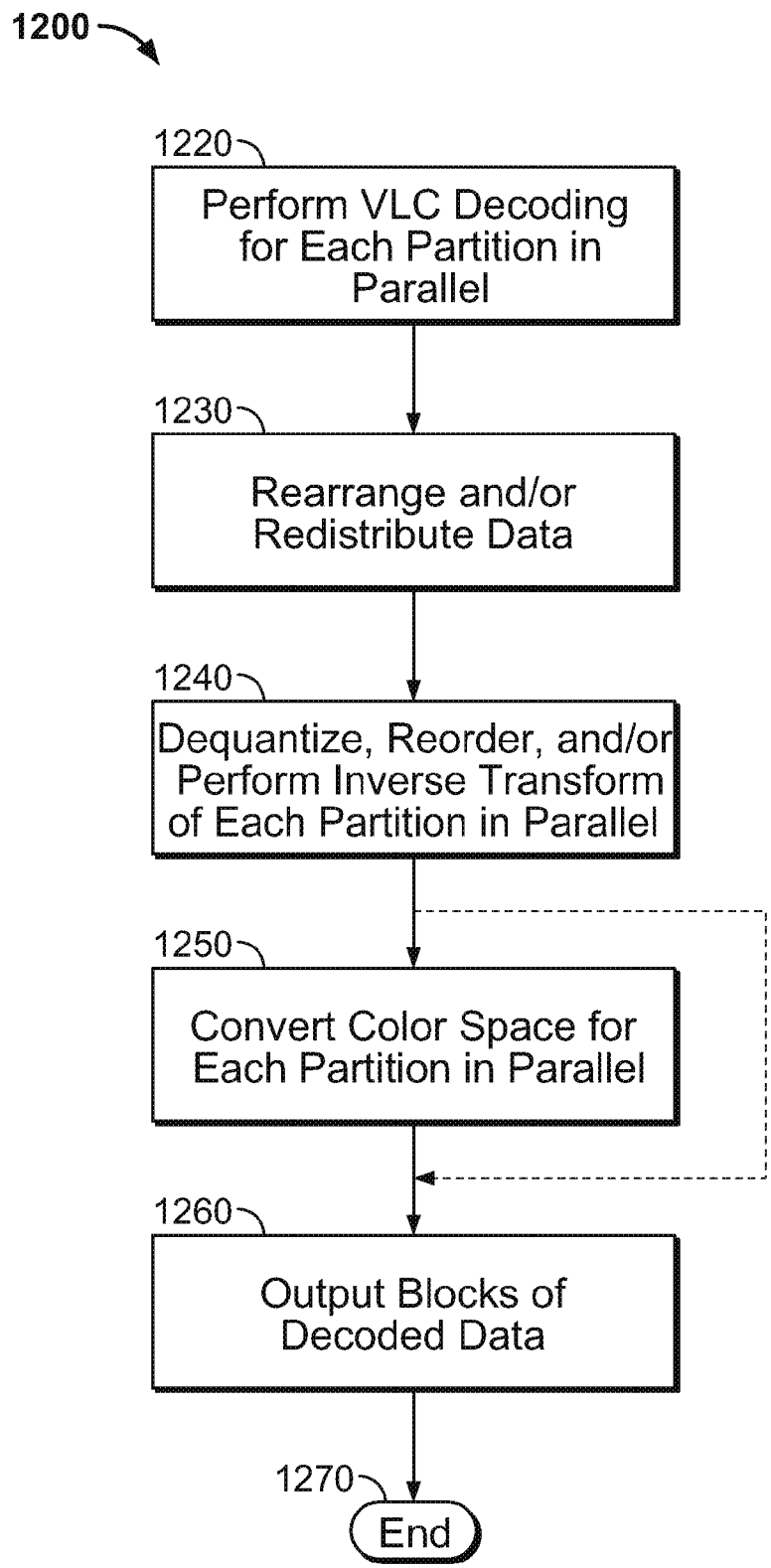
FIG. 12 illustrates a flow chart of a process for parallel decoding of a bitstream with data packing in accordance with some embodiments of the present invention.

FIG. 12 illustrates a flow chart of a process 1200 for parallel decoding of a bitstream with data packing in accordance with some embodiments of the present invention. In some embodiments, process 1200 may be performed by hardware such as that described with respect to source decoder 150 (FIG. 1). In addition, the data packing scheme may be substantially similar to the scheme described with respect to FIGS. 8 and 9. At step 1220, process 1200 begins. At 1220, VLC decoding may be performed for each partition and/or data burst in parallel. In some embodiments, VLC codes in each block and/or data burst may be decoded in the forward direction (e.g., from the most significant bit to the least significant bit) until a stopping condition is detected. Stopping conditions may include detecting that all of the VLC codes (e.g., a complete set of the AC and DC coefficients, as well as the trailing items) have been decoded in a particular partition or data burst, and/or detecting that the boundary of the partition or data burst has been reached. An offset may be marked where decoding has stopped (e.g., the next bit after the bits representing the last coded AC coefficient), and VLC codes in each block may then be decoded in the reverse bit direction (e.g., from the least significant bit to the most significant bit) until the marked offset is reached. In some embodiments, VLC codes in each block and/or data burst may be decoded in the forward direction and reverse bit direction simultaneously. In other words, the decoder may begin decoding from each end of the partition and/or data burst at the same time. The VLC codes decoded in the reverse direction may be associated with VLC codes in a different partition and/or data burst. In such a scheme, the decoder may detect that the VLC codes that are stored in the reverse bit direction in each of the partitions and/or data bursts are coded with a different coding scheme than the VLC codes stored in the normal bit direction. Detecting this property may enable the decoder to calculate the offset at which the VLC codes associated with the current partition end and the VLC codes associated with a different partition begin.

Because of the data packing scheme, it is possible that not all of the pieces of VLC codes will be available, as portions of the VLC codes may be stored in other blocks of the bitstream. If all of the VLC codes have been decoded, then the position of the decoder in the block is recorded, and the block of data is decoded in the reverse bit direction until the offset is reached. In some embodiments, a partial codeword that is cut off before the offset may not be decodable, due to the prefix-oriented nature of VLC. Process 1200 may then advance to 1230.

At step 1230, blocks of VLC codes may be rearranged and/or redistributed such that the VLC codes or portions of VLC codes stored in non-native blocks of data (i.e., blocks that they were not originally associated with in the original video data) are now aligned with their associated blocks of data. In some embodiments, this redistribution may ensure that each block has a 4×4 set of data (i.e., 16 coefficients). In some embodiments, the VLC codes may be redistributed such that all of the VLC codes in a block were coded using the same coding scheme. This redistribution may ensure that the non-native blocks of data are redistributed to their native blocks. Process 1200 may advance to step 1240.

At step 1240, the decompressed data may be dequantized, reordered, and run through an inverse transform. This step may be substantially similar to that described with respect to step 1140 (FIG. 11). Process 1200 may then advance to step 1250. In some embodiments, process 1200 may bypass step 1250 and advance to step 1160. At step 1250, the dequantized data may be converted back into its original color space. This step may be substantially similar to that described with respect to step 1150 (FIG. 11). Process 1200 may then advance to step 1260. At step 1260, the compressed data may be output. In some embodiments, this output may be a high speed memory interface, such as a DDR SDRAM memory bus. In other embodiments, the compressed data may be output as a data stream. Process 1200 may then advance to step 1270 and end.

The disclosed circuits, components, and methods can be implemented using means such as digital circuitry, analog circuitry, and/or a processor architecture with programmable instructions. Additionally, components and/or methods that store information or carry signals can operate based on electrical, optical, and/or magnetic technology, and can include devices such as flip-flops, latches, random access memories, read-only memories, CDs, DVDs, disk drives, or other storage or memory means. The disclosed embodiments and illustrations are exemplary and do not limit the scope of the disclosed technology as defined by the following claims.

What is claimed is:

1. A method of encoding video data into a bitstream, wherein the video data is divided into a series of non-overlapping blocks, comprising:
   encoding AC coefficients associated with the video data into the bitstream, wherein the AC coefficients are each associated with a respective position in a block of the video data;
   encoding quantization errors associated with the AC coefficients into the bitstream by:
      assigning priorities to the quantization errors in the bitstream based on the positions associated with their respective AC coefficients; and
      appending the quantization errors into the bitstream in an order based, at least in part, on the priorities assigned to the quantization errors.

2. The method of claim 1, wherein the quantization errors are appended into a fixed space in the bitstream, and the quantization errors with highest priority are encoded in reverse-bit order into least significant bits of the fixed space.

3. The method of claim 1, further comprising:
   allocating a fixed space to encode a portion of the video data in the bitstream;
   partitioning the fixed space to encode each block of the portion of the video data based, at least in part, on a bandwidth of a data bus of a processor encoding the video data; and
   encoding locations of the partitions into a header in the fixed space.

4. The method of claim 1, further comprising:
   encoding DC coefficients associated with the video data into the bitstream, wherein the DC coefficients are each associated with a respective position in a block of the video data; and
   determining decodable points in the bitstream based, at least in part, on an amount of space required to store the encoded AC coefficients, DC coefficients, and quantization errors associated with each block in a set of blocks of the video data.

5. The method of claim 4, further comprising:
   appending the encoded AC coefficients, DC coefficients, and quantization errors associated with a first block of video data into a first portion of the bitstream until a decodable point is reached, wherein a remaining portion of the encoded AC coefficients, DC coefficients, and quantization errors associated with the bitstream is not stored in the first portion of the bitstream; and
   storing the remaining portion of the encoded AC coefficients, DC coefficients, and quantization errors in an unused portion of a second portion of the bitstream.

6. The method of claim 5, wherein the remaining portion of the encoded AC coefficients, DC coefficients, and quantization errors are stored in the second portion of the bitstream in reverse-bit order.

7. The method of claim 4, wherein the DC coefficients are encoded based, at least in part, on the differences between the DC coefficients in a first block and the DC coefficients in a second block adjacent to the first block.

8. Circuitry for encoding video data into a bitstream, wherein the video data is divided into a series of non-overlapping blocks, the circuitry comprising a source encoder configured to:
   encode AC coefficients associated with the video data into the bitstream, wherein the AC coefficients are each associated with a respective position in a block of the video data;
   encode quantization errors associated with the AC coefficients into the bitstream by:
      assigning priorities to the quantization errors in the bitstream based on the positions associated with their respective AC coefficients; and
      appending the quantization errors into the bitstream in an order based, at least in part, on the priorities assigned to the quantization errors.

9. The circuitry of claim 8, wherein the source encoder is further configured to append the quantization errors into a fixed space in the bitstream, and quantization errors with the highest priority are encoded in reverse-bit order into least significant bits of the fixed space.

10. The circuitry of claim 8, wherein the source encoder is further configured to:
   allocate a fixed space to encode a portion of the video data in the bitstream;
   partition the fixed space to encode each block of the portion of the video data based, at least in part, on a bandwidth of a data bus of a processor encoding the video data and
   encoding locations of the partitions into a header in the fixed space.

11. The circuitry of claim 8, wherein the source encoder if further configured to:
   encode the DC coefficients associated with the video data into the bitstream, wherein the DC coefficients are each associated with a respective position in a block of the video data; and
   determine decodable points in the bitstream based, at least in part, on an amount of space required to store the encoded AC coefficients, DC coefficients, and quantization errors associated with each block in a set of blocks of the video data.

12. The circuitry of claim 11, wherein the source encoder is further configured to:

append the encoded AC coefficients, DC coefficients, and quantization errors associated with a first block of video data into a first portion of the bitstream until a decodable point is reached, wherein a remaining portion of the encoded AC coefficients, DC coefficients, and quantization errors associated with the bitstream is not stored in the first portion of the bitstream; and storing the remaining portion of the encoded AC coefficients, DC coefficients, and quantization errors in an unused portion of a second portion of the bitstream.

13. The circuitry of claim 12, wherein the remaining portion of the encoded AC coefficients, DC coefficients, and quantization errors are stored in the second portion of the bitstream in reverse-bit order.

14. The circuitry of claim 11, wherein the DC coefficients are encoded based, at least in part, on the differences between the DC coefficients in a first block and the DC coefficients in a second block adjacent to the first block.

* * * * *